United States Patent

[11] 3,544,061

[72] Inventors Richard M. Moy;
 Sam Huniu, Los Angeles, California
[21] Appl. No. 595,287
[22] Filed Oct. 14, 1966
[45] Patented Dec. 1, 1970
[73] Assignee TRW Inc.
 Redondo Beach, California
 a corporation of Ohio

[54] INTEGRAL THROTTLE VALVE SERVO-ACTUATOR
 5 Claims, 1 Drawing Fig.
[52] U.S. Cl. .................................................... 251/24,
 251/30, 251/205, 60/258
[51] Int. Cl. ..................................................... F16k 31/40
[50] Field of Search ........................................... 251/25,
 205, 30, 24; 60/258

[56] References Cited
UNITED STATES PATENTS
| | | | |
|---|---|---|---|
| 3,205,656 | 9/1965 | Elverum .......................... | 239/416.4 |
| 3,282,552 | 11/1966 | Sommesse ...................... | 251/30X |

*Primary Examiner*—Arnold Rosenthal
*Attorneys*—Daniel T. Anderson, Donald W. Graves and William B. Leach ABSTRACT: To vary fluid flow in the valve which utilizes a cavitating venturi principle, an actuation system is provided to control movement of the valve pintle. The actuation force for positioning the pintle is provided by fluid pressure operating on a piston which is integrated with the pintle. To move the pintle in the opposite direction there is provided a vent into the low pressure region of the cavitating venturi throat.

Patented Dec. 1, 1970
3,544,061
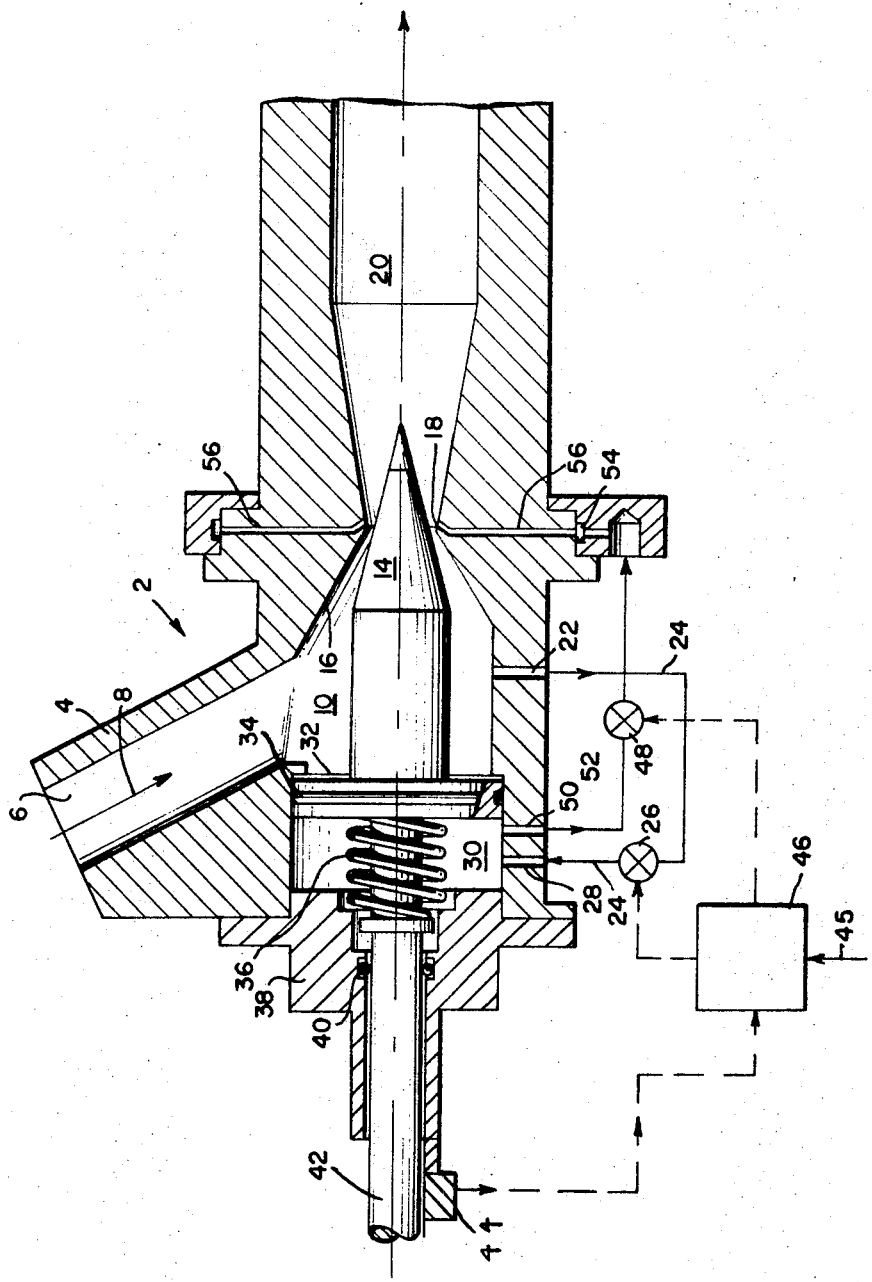
Sam Huniu,
Richard M. Moy,
INVENTORS.
BY.
Donald W. Graves
ATTORNEY.

INTEGRAL THROTTLE VALVE SERVO-ACTUATOR

This invention relates to flow control devices.

More particularly, this invention relates to a throttling structure for rocket engines or the like.

This invention is also directed toward a valve for metering flow between an inlet and an outlet, combined with an integral hydraulic actuation system.

In the area of rocket engines and gas generating devices, there is often a need for providing some mechanism whereby the ratio of maximum to minimum thrust can be controlled over a wide range such as 10:1 or greater. In the past, with liquid propellant rocket engines, throttling was typically accomplished by providing upstream valves. This approach is generally unsuccessful at low thrust levels since a minimum pressure drop must be maintained across the injector face to insure combustion stability. Combustion instability results from an inadequate mixing of propellants which occurs due to the propellant lacking sufficient velocity when entering the combustion chamber. When the upstream valves reduce the flow of propellant, the pressure drop occurs across the valves rather than at the injector face. The propellant tends to dribble, resulting in inadequate mixing and therefore combustion instability.

To obviate this problem of combustion instability, several approaches have been made. These include the injection of an inert gas such as disclosed in the U.S. Pat. No. 3,045,424 to Morrell. Propellant velocity is maintained at a sufficiently high level during deep throttling conditions by injecting an inert gas downstream of the propellant valves. However, this system requires a supply of inert gas which does not contribute to combustion, and therefore results in a lack of efficiency and a resultant lowering of specific impulse.

A mechanical throttling system is described in the U.S. Pat. No. 3,234,731 to Dermody et al. This system, however, is complex and requires many parts.

Another example of a throttling system is described in the U.S. Pat. No. 3,205,656 to Elverum assigned to the assignee of this invention. This throttling system operates through a combination of a cavitating venturi and a variable area injector. A cavitating venturi is advantageous for throttling since flow through the venturi is, for all practical purposes, dependent only upon upstream pressure and the area of the venturi throat. In the patent to Elverum et al., injection velocity is maintained by controlling the injector orifice area.

This invention likewise utilizes the cavitating venturi principle which provides a constant reference downstream pressure which is the vapor pressure of the fluid at the cavitating venturi throat. An actuation system is used to control movement of a valve pintle so as to vary the thrust level. The actuating force for positioning the pintle at any point within a specified thrust range is provided by propellant pressure operating in one direction on a piston integral with the pintle, and venting of upstream pressure operating on the piston into the low pressure region of the cavitating venturi throat in the other direction.

In a like manner this invention is applicable to a valve for controlling flow of fluid in a conduit. The actuating force is likewise fluid pressure.

The objects and advantages of this invention will become apparent as this description proceeds taken in conjunction with the drawing in which:

The FIG. is a view, partially in cross section, of a throttling device constructed according to this invention.

Shown generally at 2 in the FIG. is a throttling device which illustrates the features of this invention. A housing 4 is connected to a source of fluid such as propellant under pressure which is conducted through passage 6 in the direction of arrow 8 into annular manifold 10.

A cylindrical pintle 12 is provided with a cone-shaped portion 14 which forms with wall 16 an annular throat area 18 which provides for cavitation flow at all pintle positions. It can be appreciated that when pintle 12 moves to the left as viewed in the FIG. that the area of throat 18 increases. Thus, it can be seen that with a constant upstream pressure, the flow of fluid through throat 18 is dependent upon the area of throat 18 as long as downstream pressure in region 20 remains below a specified level, normally approximately 85 percent of upstream pressure. When this occurs, the pressure level in region 18 is always equal to the vapor pressure of the fluid. Since this vapor pressure is constant at a given temperature and upstream pressure, it is evident therefore that cavitation throttling is proportionate only to the area of throat 18, or to any given pintle positions with respect to the fixed throat.

At least one orifice 22 is provided which connects manifold 10 with a conduit 24 shown in schematic for clarity. This conduit has located therein an on-off valve 26. Conduit 24 then passes into at least one orifice 28 into manifold 30. A spring 36 is provided which seats against housing portion 38 and against piston 32 creating a net compensating force to move pintle 12 to the right. An O-ring seal is provided at 40 to prevent flow of fluid from manifold 30 around shaft 42. This forms a hydraulic circuit between both sides of piston 32. At least one orifice 50 passes fluid from manifold 30 into conduit 52 which is shown in schematic. This fluid then passes through on-off valve 48 and through manifold 54 into orifices 56 when valve 48 is open. This arrangement constitutes another hydraulic circuit which is between manifold 30 and the cavitating region 20. Valves 26 and 48 are normally closed and open only when actuated by the proper signal from controlling device 46.

A position sensing mechanism is shown at 44 which may comprise a potentiometer. The output from this potentiometer is determined by the position of shaft 42 and pintle 12.

A controlling or switching device 46 is provided to activate valves 26 or 48 based on a preset command signal dependent on the desired position of pintle 12. When the signal emanating from the position feedback device 44 is equal to the command signal 45 fed into control 46, the resulting output is zero. When these signals differ, then an output signal is either fed to valve 26 or valve 48. When the output signal from control 46 is zero, valves 26 and 48 are closed.

In operation, propellant or other fluid flows in the direction of arrow 8 into manifold 10 through throat 18 and into cavitating region 20. This fluid then passes downstream of throat 18 and region 20 to either mix with another propellant, or, if another fluid, can be used for other purposes. When valves 26 and 48 are both closed, pintle 12 will remain fixed and hydraulically balanced. When a command signal is issued to control device 46 to increase flow through throat 18, valve 48 which may be solenoid actuated, is opened. This allows fluid to be vented from manifold 30 through orifices 56 into cavitating region 20. This reduces the pressure in manifold 30 and because of the upstream pressure in manifold 10, will move piston 32 and pintle 12 to the left thus increasing the area of throat 18. Potentiometer or position sensing device 44 will generate a signal which is proportionate to position of shaft 42.

When the right position is reached, the signal generated by indicator 44 will equal that of control signal 46 resulting in closing of valve 48. With both valves closed, pintle 12 remains stationary. With a fixed command signal, any deviation of the pintle from the present position will actuate position indicating device 44 which will open either valve 26 or 48. For example, when valve 26 is opened, pressure in manifold 10 will pressurize manifold 30, which assisted by spring 36 will move pintle 12 to the right. To throttle down the device, the command signal for switching device 46 will open valve 26. It is pointed out, that in no event are valves 26 and 48 simultaneously open. Also, the piston area subjected to upstream pressure in manifold 30 is always greater than the piston area subjected to upstream pressure in manifold 10.

Although not shown, a mechanically linked throttling structure can be provided for another propellant. Thus, flow of the other propellant is directly linked to flow of propellant through throat 18 to provide the correct mixture ratio. These propellants are mixed downstream of region 20.

Although this device has been described as a propellant metering device, it can be appreciated that the invention has equal utilization as a flow metering valve.

Several advantages are present with this arrangement. For example, the actuating force for the pintle is provided solely by fluid pressure. This eliminates the need for external electromechanical actuators which have low response and are bulky and heavy. The valves require minimum electrical power since they merely open or close momentarily.

In addition, there is no venting of fluid overboard. All of the fluid or propellant which is vented passes through orifice 56 into the main stream, thus assuring no loss of fluid. This is particularly significant when viewed in terms of space contamination requirements.

Having described this invention, it is to be understood that it is to be limited only by the scope of the claims appended hereto.

We claim:
1. A valve comprising:
   an inlet;
   an outlet;
   a throat portion between said inlet and outlet;
   a longitudinal movable pintle having one end thereof adapted to enter said throat and form therewith a variable area cavitating venturi, said area being dependent on the position of said pintle;
   a piston associated with said pintle and movable therewith;
   a cylinder surrounding said piston;
   first conduit means to admit fluid from said inlet to said cylinder;
   second conduit means to vent fluid from said cylinder;
   normally closed first and second valve means for each of said first and second conduit means respectively; and
   control means responsive to the position of said pintle to selectively open either of said first and second valve means, whereby said pintle is adapted to be selectively moved to a predetermined position to open a predetermined cavitating venturi area.

2. A valve according to claim 1 wherein said piston is adapted to move said pintle to a position to decrease the area of said cavitating venturi when said first valve means is opened and said second valve means is closed and further to move said pintle to a position to increase the area of said cavitating venturi when said first valve means is closed and said second valve means is open.

3. A valve according to claim 2 wherein said control means includes a pintle position indicator, said pintle indicator being adapted to actuate said control means at a preselected pintle location to close said first and second valve means.

4. A valve according to claim 3 wherein said pintle position indicator is adapted to actuate said control means to open said first valve means when said pintle moves away from said preselected pintle position in a first direction and wherein said pintle position indicator is adapted to actuate said control means to open said second valve means when said pintle moves away from said preselected pintle position in a second direction.

5. A valve according to claim 1 wherein said second conduit means is adapted to vent fluid from said cylinder adjacent said cavitating venturi area into said outlet.